US008538639B2

(12) United States Patent
Noll et al.

(10) Patent No.: US 8,538,639 B2
(45) Date of Patent: Sep. 17, 2013

(54) METHOD FOR CLOSED-LOOP POWER CONTROL OF A ROAD FINISHING MACHINE OR FEEDER AND A ROAD FINISHING MACHINE OR FEEDER COMPRISING THE SAME

(75) Inventors: Tobias Noll, Roschbach (DE); Ralf Weiser, Ladenburg (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 349 days.

(21) Appl. No.: 12/948,327

(22) Filed: Nov. 17, 2010

(65) Prior Publication Data
US 2011/0126533 A1 Jun. 2, 2011

(30) Foreign Application Priority Data
Nov. 30, 2009 (EP) .................................. 09014845

(51) Int. Cl.
*B60W 10/06* (2006.01)
*E01C 19/48* (2006.01)

(52) U.S. Cl.
USPC ............................................ 701/50; 701/102

(58) Field of Classification Search
None
See application file for complete search history.

(56) References Cited

U.S. PATENT DOCUMENTS

| 5,967,756 | A  | * | 10/1999 | Devier et al. .................... 417/18 |
| 7,469,534 | B2 | * | 12/2008 | Nishi et al. ...................... 60/428 |
| 2007/0150166 | A1 | | 6/2007 | Mino et al. |
| 2009/0143952 | A1 | | 6/2009 | Chisholm et al. |

FOREIGN PATENT DOCUMENTS

| DE | 102008058174 A1 | 7/2009 |
| JP | 2002039111 A | 2/2002 |
| WO | WO2010006759 A1 | 1/2010 |

* cited by examiner

*Primary Examiner* — Michael J Zanelli
(74) *Attorney, Agent, or Firm* — Fish & Richardson P.C.

(57) ABSTRACT

In the hydrostatic working operation of a road finishing machine or a feeder which comprises a primary power plant with an internal combustion engine (M) and several hydraulic variable displacement pumps, which are hydraulically connected to hydraulic motors of working components, and which possesses a computerized control device, the internal combustion engine is operated within its engine-specific characteristic map in response to the load condition by dynamic speed adaptation in a characteristic zone with optimal consumption, and the displacements ($V_{sHP}$) of the variable displacement pumps are simultaneously automatically adapted for keeping the volume flow rates for the hydraulic motors constant. In the road finishing machine or the feeder, in the control device or connected to the same, a control loop for evaluating the load condition of the internal combustion engine and the current displacement of the variable displacement pumps is provided, by means of which the speed can be dynamically adjusted to or in a characteristic zone with optimal consumption, and simultaneously with the adjustment of the speed for keeping the volume flow rates for the hydraulic motors constant, the displacements of the variable displacement pumps can be automatically adapted.

14 Claims, 4 Drawing Sheets

METHOD FOR CLOSED-LOOP POWER CONTROL OF A ROAD FINISHING MACHINE OR FEEDER AND A ROAD FINISHING MACHINE OR FEEDER COMPRISING THE SAME

FIELD OF THE INVENTION

The invention relates to a method for closed-loop power control at least in a hydrostatic working operation of a road finishing machine or feeder and to a road finishing machine or a feeder including a primary power plant (P) with an internal combustion engine (M), preferably a diesel engine, and several hydraulic variable displacement pumps (4) for the hydrostatic working operation of working components.

BACKGROUND

In the hydrostatic working operation of road finishing machines or feeders, the internal combustion engine is traditionally operated at a fixed speed level, independent of how much hydraulic or electric energy is consumed by working components. The reason for this is the ambition confirmed by experience to keep all parameters constant and not to provide any flexibility for the operation of the internal combustion engine as former closed-loop control technology and the reaction of the driver did not permit to adapt to changing laying situations quickly enough. This brings about that engine operation requires high specific fuel consumption mainly with small loads of the internal combustion engine at a fixed high speed level, and that this high speed level results in a considerable amount of environmental and noise pollution. With such load conditions, moreover unnecessary drag losses result, for example due to fans and hydraulic pumps which also increase fuel consumption. It is already known to adjust the speed of the internal combustion engine dynamically, for example by the driver, when the road finishing machine or feeder is driven for transport. This is done manually and independent of the load condition of the internal combustion engine.

WO 2010/006759 A1 recommends to load-dependently change the speed of the internal combustion engine during the operation of a road finishing machine such that the speed or the frequency of at least one drive is at least approximately kept constant. For this, two different strategies are employed. In the one case, energy supplied to certain drives of the road finishing machine is kept constant in case of a reduced energy demand by diverting excessive energy to other drives which do not require a constant speed. Conversely, if the power of at least one certain drive of which the speed must be kept constant is increased, energy is taken off and diverted from other drives which do not require a constant speed. In the second case, if the energy diversion is no longer sufficient, in case of an increase of power delivered to a drive requiring a constant speed, its energy supply is increased by increasing the speed of the internal combustion engine. Conversely, if the power demand of a drive requiring a constant speed drops, the speed of the internal combustion engine is reduced. In each case, the hydraulic volume flow rate is changed, while the hydraulic pressure, however, remains constant. Thus, the volume flow rates are changed for the drives requiring a constant speed, the course of the closed-loop control being such that first a speed drop or a speed increase is permitted and waited for within a predetermined speed frame before the control goes against it.

Furthermore, from DE 10 2008 058 174 A1, a closed-loop speed control system for the internal combustion engine of a compacting vehicle, e.g. a compaction roller, is known wherein pressure sensors are employed for determining the consumed hydraulic power of hydraulic motors supplied by variable displacement pumps. Closed-loop speed control is accomplished by compensating the actually required hydraulic power and the power output by the diesel engine. Utilizing the signals of the pressure sensors, by compensation, a signed difference between the required hydraulic power and the power output of the internal combustion engine is detected, and the speed of the internal combustion engine is controlled in response thereto. The displacement of the respective variable displacement pump is manually adjusted to a certain value and can be changed by the driver if he detects it to be inappropriate.

Further prior art can be found in US 2007/150166 A and JP 2002 039111 A.

SUMMARY OF THE INVENTION

The object underlying the invention is to provide a method for closed-loop power control at least in a hydrostatic working operation of a road finishing machine or feeder as well as a road finishing machine or feeder in which possibilities of saving energy or fuel arising during the hydrostatic working operation of a road finishing machine or a feeder, respectively, under varying laying or working conditions can be better utilized. The possible savings existing in road finishing machines and feeders due to the special requirements for the hydrostatic working operation is to be utilized as efficiently as possible without compromising the constant readiness for operation, and it should preferably result in savings of several tons of fuel per year per finishing machine or feeder with an average size and utilization.

This object is achieved with the method and road finishing machine or feeder of the present invention.

The dynamic speed adaptation of the internal combustion engine is accomplished selectively with respect to an optimal consumption saving during the hydrostatic working operation and if at least the hydraulic power drops. A respective optimal operating point is located by evaluating the load condition of the internal combustion engine, where the load condition of the internal combustion engine, especially of a diesel engine, is ideally permanently kept constant at approx. 95%. The provided variable displacement pumps ensure a constant volume flow rate and thus a constant power take-off by the hydraulic motor independent of the initial speed generated by the internal combustion engine. By automatically adjusting the displacement in the speed adaptation to ensure the constant volume flow rate, the readiness for operation is given at any time, and the speed can nevertheless be adjusted in each case with optimized consumption by utilizing the adjustment range of the displacement. Only if, for example, the maximum displacement of the variable displacement pump is reached, a further volume flow rate increase requires a readjustment of the speed of the internal combustion engine. The displacement of the variable displacement pumps is thus always adapted to the respective corresponding operating point of the internal combustion engine in the hydrostatic working operation.

During the hydrostatic working operation of the road finishing machine or the feeder, in the laying operation as well as during a transport drive, though preferably in the laying operation, a considerable amount of fuel can be saved by the dynamic speed adaptation of the internal combustion engine while the required readiness for operation is maintained, environmental and noise pollution are minimized whenever possible, and clearly less drag losses e.g. due to fans and/or hydraulic pumps also result at low speed levels.

In one appropriate method variant, the adaptation of the displacements is accomplished by means of an engine speed/displacement characteristic deposited or stored in the control device, preferably taking into consideration previously calibrated control current values for an electric displacement adjustment. The adaptation of the displacements is here essentially accomplished without control by means of the previously stored characteristic to ensure constant volume flow rates. If the speed is controlled, for example, to a lower level for the internal combustion engine, the control device can correspondingly increase the displacement of the variable displacement pump or variable displacement pumps with reference to the present characteristic. If this characteristic is accomplished taking into consideration previously calibrated control current values for an electric displacement adjustment, this can be done with only little closed-loop control equipment as the anyway existing control currents or the control current changes can be directly utilized as controlled variables for speed adaptation. The control current is meant to be, for example, the respective current value with which a proportional solenoid valve is actuated such that it adjusts a displacement corresponding to the control current value in the adjustment device of the variable displacement pump via at least one actuating cylinder, for example, in a swash plate piston pump, the angle of inclination of the swash plate.

In an alternative method variant, the adaptation of the displacements is effected via closed-loop control with a setpoint/actual value compensation of values generated and predetermined by means of speed or velocity sensors of the hydraulic motors or their working components for the control device or the control circuit. As in a road finishing machine or a feeder, speed sensors are often already available, e.g. in the travel drive or in the conveyor device, such information usable for keeping the volume flow rates constant are anyway available. On the other hand, the equipment of a hydraulic motor or its working component can be cheaply realized with a speed or velocity sensor, in any case less expensive than the equipment with pressure sensors.

In one appropriate method variant, a current operating point is adjusted within a characteristic zone of the internal combustion engine with optimal consumption, at which point the required volume flow rates for the hydraulic motors are kept constant by adapting the displacements. The current operating point can here be set within the characteristic zone with optimal consumption such that a new operating point with higher or lower speed can still be adjusted within the characteristic zone with optimal consumption if the maximal or minimal displacement is reached, to further keep the required volume flow rates constant. Thus, a considerable amount of fuel is saved by shifting the current operating point mainly in the characteristic zone with optimal consumption, even if the adaptation range of the displacements is no longer sufficient.

Furthermore, it can be appropriate to select operating points of the internal combustion engine along an optimal engine output characteristic in each case just below a maximal power characteristic within the displacement adaptation range of the variable displacement pumps possible in each case. This optimal engine output characteristic is, for example, by about 5% lower than the maximal output characteristic of a diesel engine.

It can furthermore be appropriate in the closed-loop control to adjust a new current operating point with a higher speed of the internal combustion engine when the respective maximally possible displacement is reached and there is a risk of falling below the required volume flow rate, and to adjust a new current operating point with a lower speed of the internal combustion engine when the respective minimally possible displacement is reached and there is a risk of exceeding the required volume flow rate, preferably either still within the characteristic zone with optimal consumption, or then outside the characteristic zone with optimal consumption, where outside the characteristic zone with optimal consumption, the operating points are not only set to one high fixed speed level, as before, but fluently and always with respect to a minimized fuel consumption. The sudden speed changes can be predetermined or variable depending on the situation.

In one appropriate method variant, in a control loop defining the control response in the dynamic speed adaptation of the internal combustion engine, the respective current load condition or load factor of the internal combustion engine and the current displacement of the variable displacement pumps are evaluated taking into consideration the required volume flow rates. This evaluation is performed continuously so that the readiness for operation of the road finishing machine or the feeder is at no time compromised and the internal combustion engine is nevertheless operated with optimized consumption in each case.

In one appropriate embodiment of the road finishing machine or the feeder, for the dynamic speed adaptation of the internal combustion engine depending on the current load condition, stored or deposited operating points in the form of a characteristic representing the dependence between the engine speed and the displacement are provided. This characteristic is processed by the control device or a closed-loop control system associated to the same to operate the internal combustion engine with optimized consumption despite the maintenance of the readiness for operation.

In one alternative embodiment of the road finishing machine or the feeder, the hydraulic motors or the working components driven by the same comprise speed or velocity sensors which are connected to the closed-loop control system or the control device so as to transmit signals, the control circuit containing a compensating section for a setpoint/actual-value compensation of speed or velocity values in the control carried out for keeping the required volume flow rates constant. As it is common in road finishing machines or feeders, at least some hydraulic motors are anyway already equipped with velocity or speed sensors whose signals can be easily utilized for the speed adaptation of the internal combustion engine.

Appropriately, the displacement of each variable displacement pump is adjusted via at least one proportional solenoid valve by feeding current with a variable control current. As the current control value is proportional to the respective displacement, it can be easily processed directly during the closed-loop control, above all if the control currents of different variable displacement pumps are calibrated in advance for the stored or deposited operating point characteristic.

Appropriately, a pump transfer gear is provided between the variable displacement pumps and the internal combustion engine, which comprises corresponding power divergences to the variable displacement pumps and drives them with optimal speeds relative to the crankshaft speed of the internal combustion engine. Apart from the variable displacement pumps, at least one further hydraulic pump, e.g. a fixed displacement pump for further consumers, can be connected to the pump transfer gear. Furthermore, the internal combustion engine can additionally drive at least one e.g. power-regulated generator which is used, for example, for power supply to heating devices in the road finishing machine or the feeder and further electric equipment.

Finally, the road finishing machine or feeder should comprise hydraulic motors connected with variable displacement pumps at least for one of the following working components: for at least one travel drive which can comprise a crawler chassis or a wheel gear, at least one longitudinal-transverse or ascending conveying device for laying material, at least one screed compaction and/or adjustment means.

BRIEF DESCRIPTION OF THE DRAWINGS

With reference to the drawings, embodiments of the subject matter of the invention will be illustrated. In the drawings.

DETAILED DESCRIPTION OF THE DRAWINGS

Figure 1:
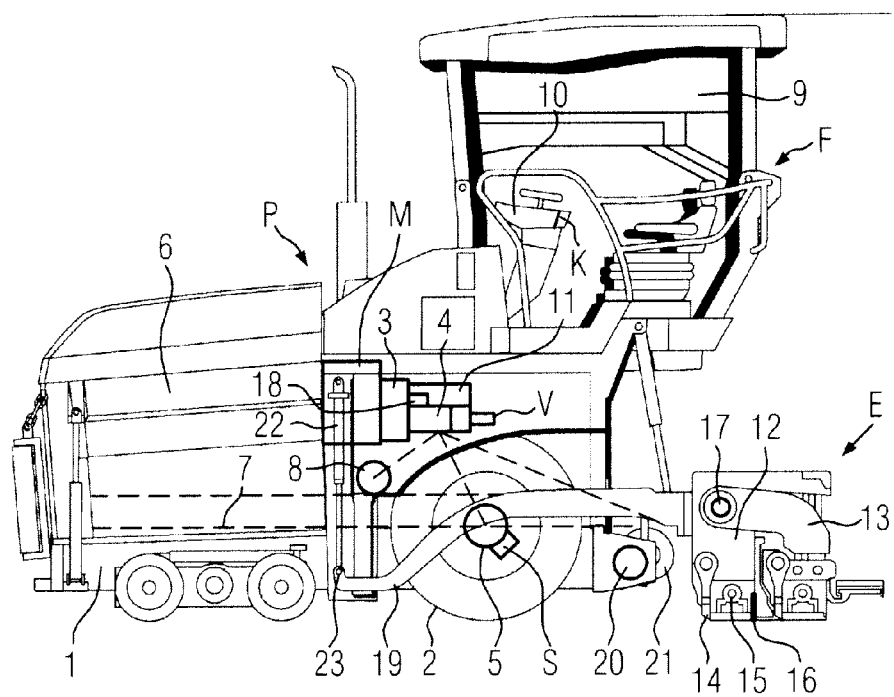
FIG. 1 shows a schematic side view of a road finishing machine.

FIG. 1 shows a road finishing machine F for laying a roadway pavement of bituminous or concrete laying material. At the front side of a chassis 1 comprising a travelling gear 2 (wheel gear or crawler gear), a material bunker 6 and behind it a primary power plant P are provided, the primary power plant P comprising an internal combustion engine M, typically a diesel engine, a pump transfer gear 3, and at least one variable displacement pump 4 arranged at the pump transfer gear 3. Apart from the variable displacement pump 4, at least one further hydraulic pump 18 can be also provided. Furthermore, a generator 11 can be driven by the internal combustion engine M. In a driver stand 9 arranged on the chassis 1, for example a computerized control device 10 is provided which comprises a control panel K with a non-depicted main traction switch and other actuation and monitoring means. At the tail of the chassis 1, a transverse distribution device 21, e.g. a worm, is arranged and driven by a hydraulic motor 20. Tow bars 19 are articulated at tow points 23 at both sides of the chassis 1, a screed E being fixed to the tow bars 19 and floatingly towed by the road finishing machine F during the laying operation. The height of the tow points 23 can be adjusted, for example, by lifting cylinders 22 to vary the angle of attack of the screed E or the pavement thickness, respectively. The screed E for example comprises a basic screed 12 as well as laterally extendable screeds 13. Corresponding hydraulic motors 17 are provided for adjusting the extendable screeds 13. As compaction means of the screed E, for example tampers 14, vibrators 15 and optionally high-compacting means 16 are provided in the basic screed 12 and in the extendable screeds 13, which can also be driven by non-depicted hydraulic motors. A longitudinal conveying device 7 extends from the material bunker 6 in the chassis 1 to the rear chassis end to be able to place the laying material at the transverse distribution device 21. The gear 2 is driven by hydraulic motors 5 which are hydraulically connected with the at least one variable displacement pump 4. A hydraulic motor 8 of the longitudinal conveying device 7, or the hydraulic motor 20 of the transverse distribution device 21, and, which is not shown, the hydraulic motors of the compacting units of the screed E or the hydraulic motors 17 and/or the lifting cylinders 22, can be operated in a similar manner.

Each variable displacement pump 4 is, for example, a swash plate axial piston pump whose displacement can be adjusted from a minimum value $V_{sHP}$ to a maximum value $V_{sHPmax}$, for example by changing the angle of inclination of the swash plate by means of at least one hydraulic cylinder which is controlled by at least one proportional solenoid valve V, such that the control current fed to the proportional solenoid valve V determines the displacement depending on its variable value. The hydraulic power taken off by the respective hydraulic motors, e.g. the hydraulic motor 5, determines the acting torque which depends on the pressure acting at the hydraulic motor. A constant torque is generated at a constant volume flow rate which can be adjusted within an adaptation range of the displacement specific for the variable displacement pump 4 at a given initial speed of the variable displacement pump 4.

Figure 2:
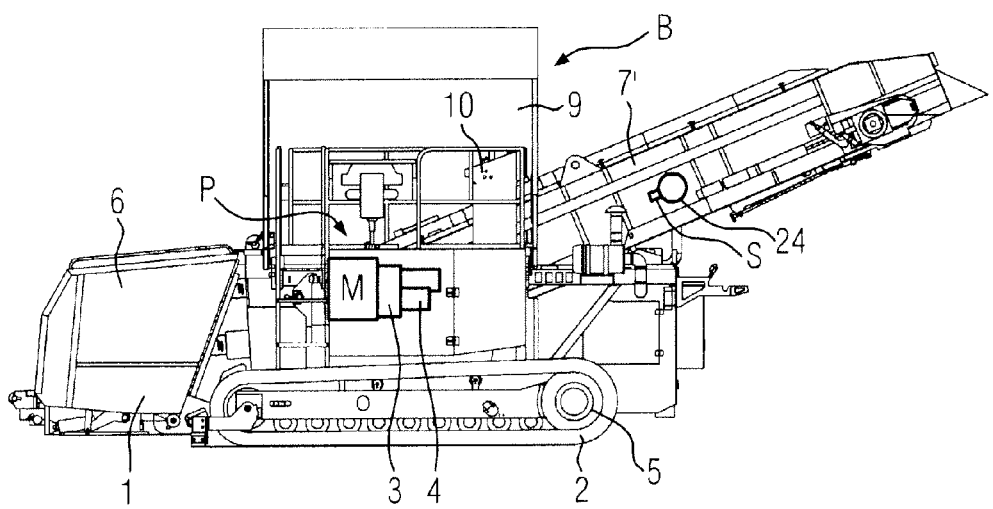
FIG. 2 shows a schematic side view of a feeder.

FIG. 2 shows a feeder B for cooperation with a road finishing machine, for example to permit the road finishing machine a continuous hydrostatic working operation independent of the laying travel speed and variations in the working width or pavement thickness, where the also hydrostatic working operation of the feeder is to be adapted to the operation of the road finishing machine, and thus the laying parameters. In its chassis 1 comprising a travel gear 2, the feeder B comprises a front material bunker 6 and at least one, for example ascending longitudinal, conveying device 7' by means of which laying material is conveyed from the material bunker 6 to the rear top and discharged to the material bunker 6 of the road finishing machine F corresponding to the demand of the road finishing machine F. The feeder B has a primary power plant P with an internal combustion engine M, typically a diesel engine, a pump transfer gear 3, and at least one variable displacement pump 4. The variable displacement pump 4 is, for example, hydraulically connected to a hydraulic motor 5 of the travel gear 2. The same or another variable displacement pump 4 can be connected to at least one hydraulic motor 24 of the conveying device 7'.

In the road finishing machine F as well as in the feeder B in FIGS. 1 and 2, speed or velocity sensors S can be associated to at least laying-relevant hydraulic motors 5 or their working components which are connected to the control device 10 so as to transmit signals.

Varying laying parameters determine the power required for the working components in the road finishing machine F as well as in the feeder B. These varying laying parameters for example comprise, without being restricted thereto, the laying width of the screed, the temperature, the composition and consistency of the laying material, the travelling resistance, the weather conditions, the upward or downward slope of the ground, the pavement thickness, the compacting degree of the pavement, the laying speed, and the like. According to the invention, a dynamic adaptation of the speed of the internal combustion engine M to the varying laying conditions or laying parameters is accomplished such that the internal combustion engine M is operated with optimized consumption without compromising the readiness for operation of the road finishing machine or the feeder. To this end, the control device 10 is equipped or connected with a closed-loop control system which automatically performs the adaptation of the speed and in the process utilizes the adaptation range of the displacement of each variable displacement pump 4 possible in each case to keep the required volume flow rate to the hydraulic motor constant.

Figure 3:
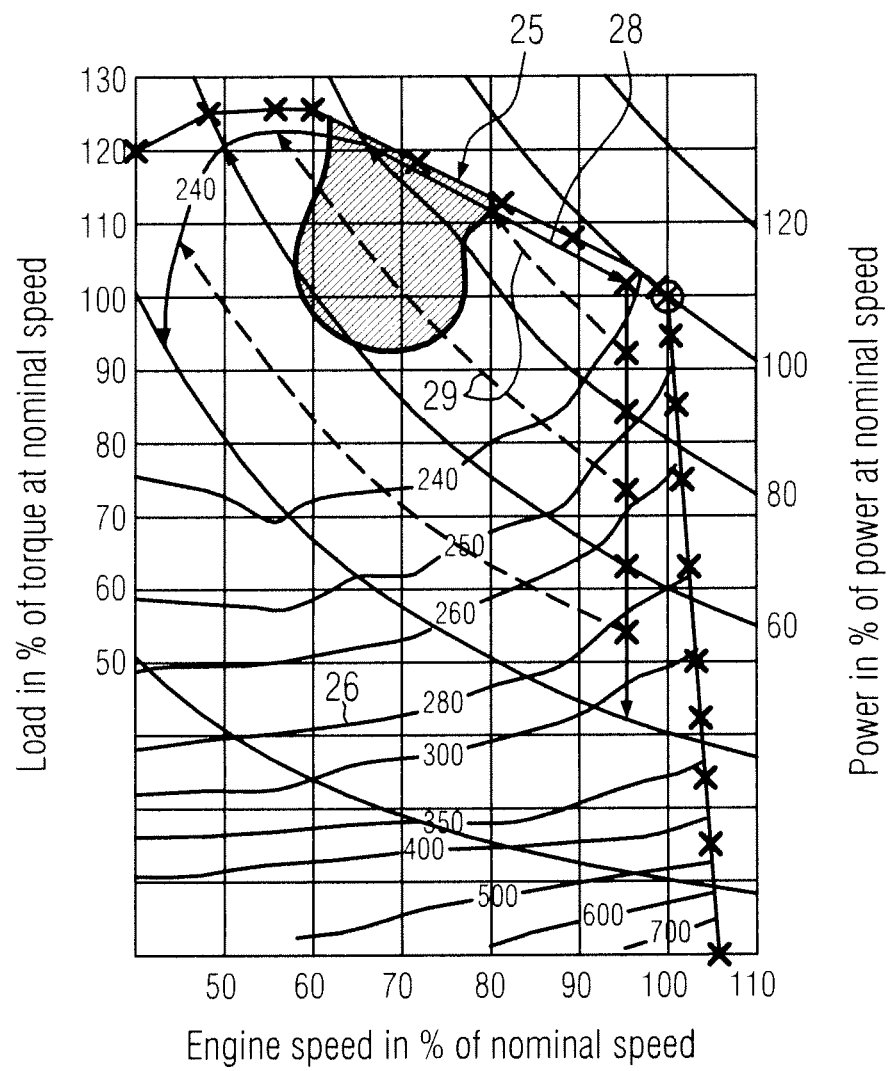
FIG. 3 shows a characteristic map of an internal combustion engine, in particular a diesel engine as part of a primary power plant of the road finishing machine or feeder.

FIG. 3 shows a typical characteristic map of an internal combustion engine, in particular a diesel engine. On the left vertical axis, the load condition or the load of the internal combustion engine is plotted in percent of the torque at the rated speed, corresponding to the power in percent of the power at the rated speed plotted on the right vertical axis, while the horizontal axis represents the engine speed in percent of the rated speed. Within the engine characteristic map, there is a characteristic zone 25 with optimal consumption which is accentuated by a shading, where the aforementioned dynamic speed adaptation of the internal combustion engine M is accomplished such that the internal combustion engine is operated within the characteristic zone 25 with optimal consumption whenever possible. The characteristic map shows the interrelationships between the operating state (engine speed and load) and the respective specific fuel consumption. The irregular family of lines in the characteristic map (conchoids) shows zones of the same specific fuel consumptions each. A vertical straight curve 27 illustrates operating points at an engine speed of about 95% of the rated speed and between about 45% of the load and the power and 100% of the load. Up to now, the internal combustion engine M was operated at this curve 27. The curve 27 represents as an example the traditional operation of the internal combustion engine at a fixed high speed level, independent of the taken off hydraulic power. A characteristic curve 28 which starts at about 100% of the load, diagonally and linearly rises to about 120% of the load and then progressively drops to about 95% of the load and 45% of the engine speed, represents operating points of the internal combustion engine with an advantageous specific fuel consumption and is realized according to the invention by the dynamic speed adaptation. The characteristic curve 28 penetrates the characteristic zone 25 with optimal consumption. It is intended according to the invention to keep the operating points along the characteristic curve 28 within the characteristic zone 25 with optimal consumption utilizing the adaptability of the displacement, and to also have them follow the characteristic curve 28 outside the optimal characteristic zone 25. By the dynamic speed adaptation of the internal combustion engine with a simultaneous adjustment of the displacement of the variable displacement pumps, the characteristic curve 28 of the operating points employed according to the invention is generated by shifting the operating points of the characteristic curve 27 along dashed arrows 29.

According to the invention, there are e.g. at least two procedures for this.

In the first case, the respective current operating point is adjusted via the control device 10 with the aid and by evaluation of the load condition of the internal combustion engine M and a stored or deposited characteristic curve which represents the dependence between the speed of the internal combustion engine and the displacement.

In the second case, the respective volume flow rate to a hydraulic motor is kept constant by effecting compensation between actual speed or velocity values and speed or velocity setpoints in the control device 10 or a closed-loop control system.

With respect to optimal fuel saving, a power characteristic just below the maximum power characteristic is to be aimed at for the internal combustion engine. Such a power characteristic essentially corresponds to the characteristic curve 28 in FIG. 3 and is shown in FIG. 4.

Figure 4:
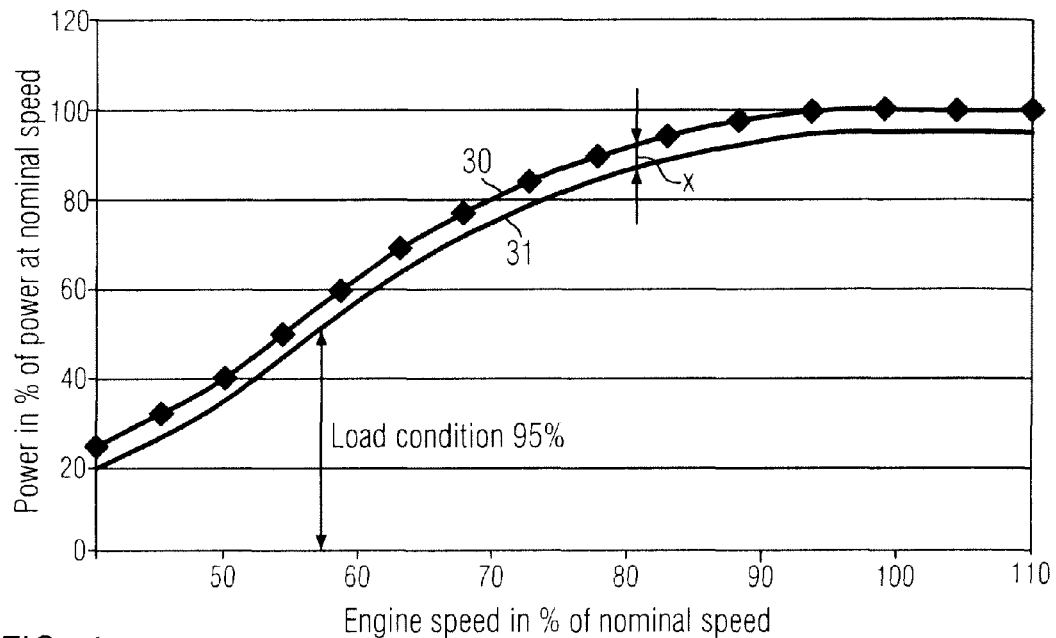
FIG. 4 shows power characteristics of the internal combustion engine, in particular diesel engine.

FIG. 4 is a diagram of the power characteristics of an internal combustion engine, in particular a diesel engine. On the vertical axis, the power of the internal combustion engine is plotted in percent of the power at the rated speed, while the horizontal axis shows the engine speed in percent of the rated speed. The maximum power curve 30 approximately corresponds to the uppermost solid curved line shown in FIG. 3. The power characteristic 31 to be aimed at in FIG. 4 lies about 5% below the maximum power characteristic 30 and extends essentially in parallel to the same. This is a load condition at 95% of the power output possible at the respective operating point, corresponding e.g. to the characteristic curve 28 in FIG. 3.

Figure 5:
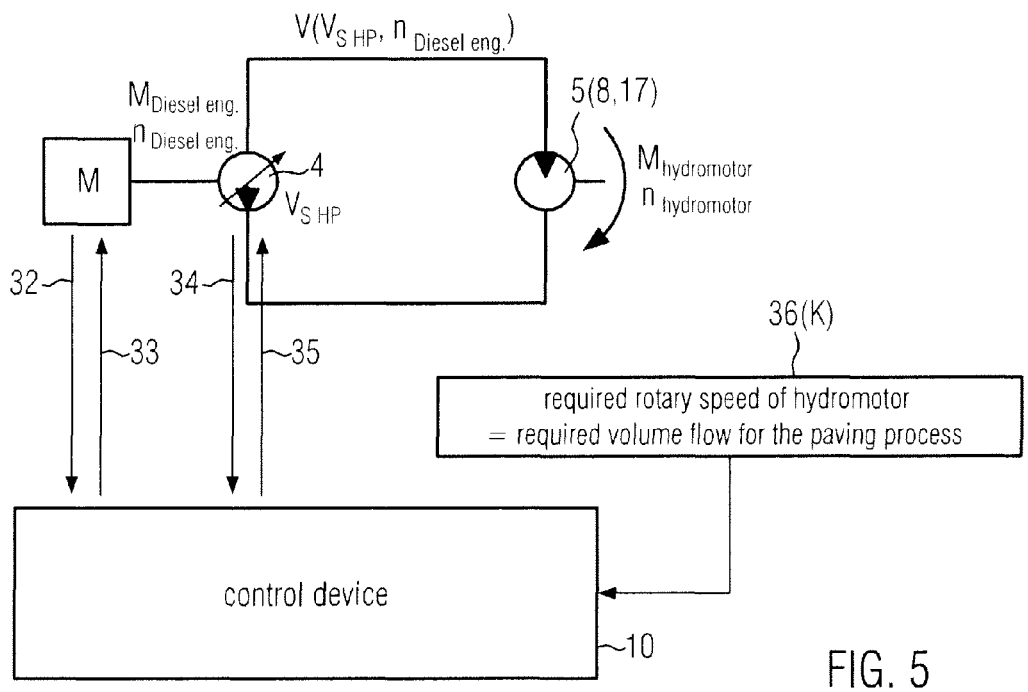
FIG. 5 shows a block diagram of a closed-loop control system for dynamic speed adaptation of the internal combustion engine in the road finishing machine or feeder.

FIG. 5 illustrates an example of a closed-loop control system of the road finishing machine F or feeder B in the form of a block diagram. The dynamic adaptation of the speed of the internal combustion engine M is executed via the control device 10 with reference to the current load condition LZ, $n_{diesel}$ actual, and the current displacement "$V_{sHP}$ actual" of the variable displacement pump, where a setpoint $n'_{diesel}$ for the speed and a setpoint $V_{sHP\ set}$ are given to the variable displacement pump 4, where with the setpoint for the displacement $V_{sHP\ set}$, the required volume flow rate V can be adjusted within an advantageous range of the engine characteristic map. The control device 10 procures the information about the current load condition LZ and the current displacement $V_{sHP\ set}$ actual, and obtains at 36, for example from the control panel K in FIGS. 1 and 2, the information about the required speed or the torque of the hydraulic motor, tantamount to the required volume flow rate for a certain part of the laying process. The control device 10 transmits a speed setpoint $n'_{diesel}$ (corresponding to the arrow 33) to the internal combustion engine M which drives the variable displacement pump 4 at the speed $n_{diesel}$, and the setpoint for the displacement $V_{sHP\ set}$ to the variable displacement pump 4 (arrow 35). The variable displacement pump 4 is then driven with the displacement $V_{sHP}$ and the speed $n_{diesel}$ to provide the required volume flow rate V for the hydraulic motor 5 (8, 17) and to keep it constant, which can also be represented as displacement $V_{sHP}$ at the speed $n_{diesel}$. In other words, in the control device 10, a closed-loop control routine or control routine is performed with the aim of maximizing the displacement $V_{sHP}$ and minimizing the engine speed $n_{diesel}$.

This will be documented with reference to the following example cases:

a) The torque $M_{hydro}$ taken off by the hydraulic motor rises at a constant speed $n_{hydro}$ of the hydraulic motor. This means that the load condition LZ of the internal combustion engine M rises, where the speed of the internal combustion engine is increased as soon as a load condition LZ of more than 95% is reached. The speed of the hydraulic motor is then kept constant by reducing the displacement $V_{sHP}$.

b) The torque $M_{hydro}$ taken off by the hydraulic motor remains constant while the speed of the hydraulic motor $n_{hydro}$ rises. This means that the load condition for the internal combustion engine rises. As of a ratio of the displacement $V_{sHP}$ to the maximally possible displacement $V_{sHPmax}$ of more than 0.95, or as of a load condition of more than 95%, the speed of the internal combustion engine is increased.

c) The torque $M_{hydro}$ taken off by the hydraulic motor rises as the speed $n_{hydro}$ of the hydraulic motor rises. The load condition for the internal combustion engine rises, as does the ratio between the given displacement $V_{sHP}$ and the maximum displacement $V_{sHPmax}$. As of a ratio of more than 0.95 of the ratio between the current displacement $V_{sHP}$ and the maximally possible displacement $V_{sHPmax}$, or as of a load condition LZ of more than 95%, the speed of the internal combustion engine is increased.

d) The torque $M_{hydro}$ taken off by the hydraulic motor drops at a constant speed n of the hydraulic motor. The load condition for the internal combustion engine drops, where as of a load condition LZ of less than 95%, the speed of the internal combustion engine is reduced. The speed of the hydraulic motor is kept constant by increasing the displacement $V_{sHP}$.

e) The torque $M_{hydro}$ taken off by the hydraulic motor remains constant while the speed of the hydraulic motor $n_{hydro}$ drops. Accordingly, the load condition for the internal combustion engine M also drops. As of a ratio of less than 0.95 between the current displacement $V_{sHP}$ and the maximally possible displacement $V_{sHPmax}$, or as of a load condition LZ of less than 95%, the speed of the internal combustion engine is reduced.

f) The torque M taken off by the hydraulic motor drops, where the speed of the hydraulic motor $n_{hydro}$ also drops. The load condition LZ for the internal combustion engine drops, as does the ratio between the displacement $V_{sHP}$ and the maximally possible displacement $V_{sHPmax}$. As of a ratio of less than 0.95 of the ratio between the actual displacement and the maximally possible displacement, or as of a load condition LZ of less than 95%, the speed of the internal combustion engine is reduced.

Figure 6:
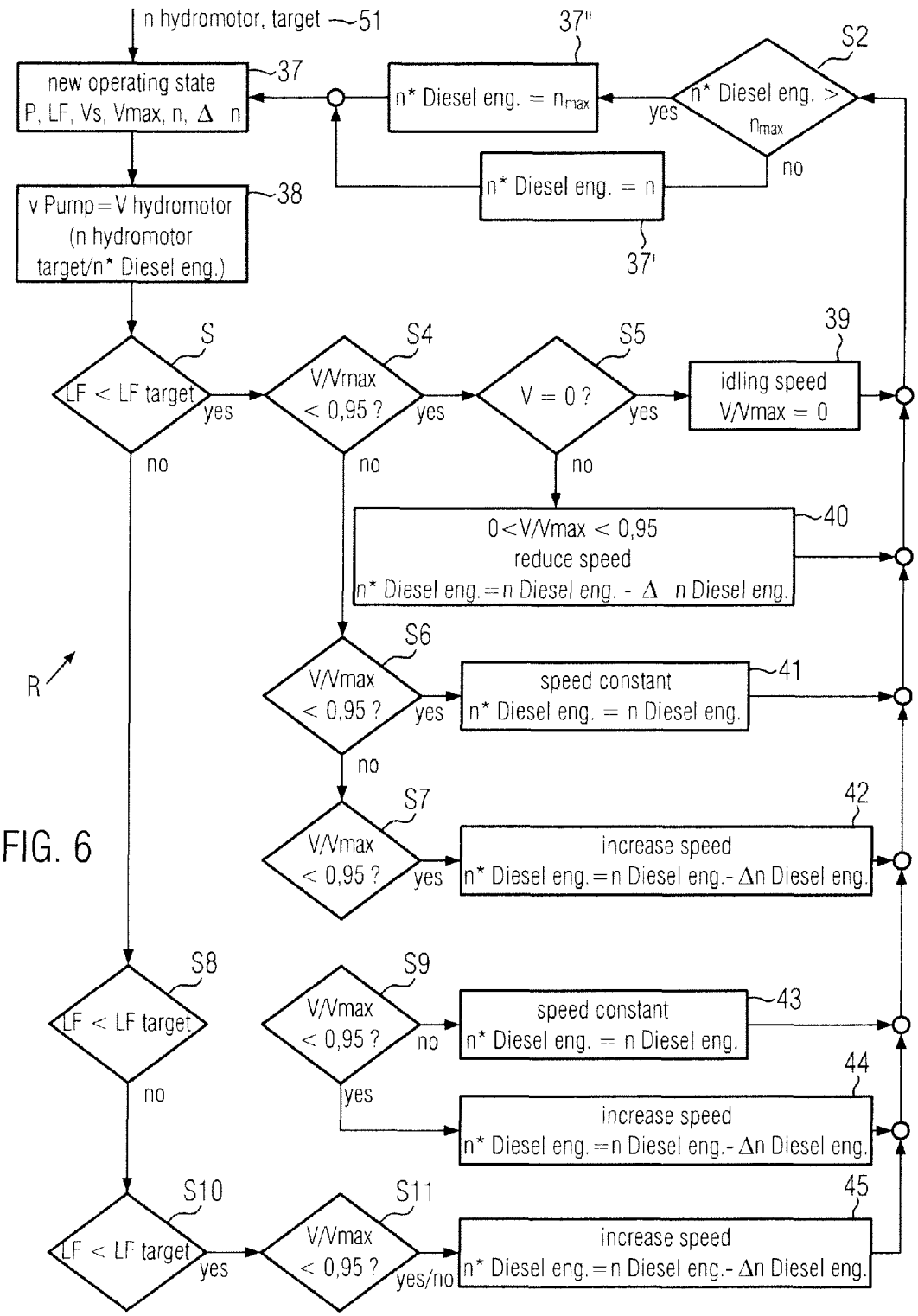
FIG. 6 shows a control loop typified by a logic flow chart.

FIG. 6 illustrates a closed-loop control circuit R as state or flow diagram which performs the dynamic adaptation of the speed of the internal combustion engine utilizing the adaptation range of the displacement of the variable displacement pump 4 possible in each case to maintain the required volume flow rate. In this closed-loop control circuit R, the load condition of the internal combustion engine LZ and the current displacement of the variable displacement pumps $V_{sHP}$ is evaluated taking into consideration the required speed of the hydraulic motor $n_{hydro}$ or the required volume flow rate V. The load condition of the internal combustion engine is expressed by LZ, i.e. a power factor, the displacement ratio $V_{sHP}/V_{sHPmax}$ as the quotient between the required displacement $V_{sHP}$ and the maximally possible displacement $V_{sHPmax}$. As input variable, the setpoint speed $n_{hydro\ set}$ of the hydraulic motor is used (step S1). According to a box 37, a new operating state is determined for example for LZ, while information from the boxes 37', 37" which are determined at a step S2 are processed. Here, it is found out in step S2 whether the setpoint speed $n'_{diesel}$ of the diesel engine is higher than the maximum speed $n_{max}$. This query then either leads to the detection in box 37' that the setpoint speed $n'_{diesel}$ of the diesel engine is below the maximum speed, or in box 37" that the setpoint speed $n'_{diesel}$ of the internal combustion engine corresponds to the maximum speed $n_{max}$. In box 38, the required displacement $V_{sHP\ set}$ of the variable displacement pump 4 is calculated for realizing the required volume flow rate V by multiplication of the displacement of the hydraulic motor $V_{sHM}$ by the setpoint speed of the hydraulic motor divided by the speed $n'_{diesel}$ of the internal combustion engine. These information from boxes 37, 38 are then processed in a step S3 to determine whether the power factor LZ of the internal combustion engine is smaller than a setpoint power factor LZ' which is fixed in advance, for example between 85% and 97%, or, corresponding to FIG. 4 with 95% of the maximum power characteristic 30. If it is found out in step S3 that the power factor LZ is smaller than the setpoint power factor LZ', it is determined in a step S4 whether the displacement ratio $V_{sHP}/V_{sHPmax}$ is smaller than 0.95. If the result of the determination in step S4 is positive, it is determined in step S5 whether the volume flow rate is zero. With a positive result in step S5, one then gathers the no-load speed or a displacement ratio $V_{sHP}/V_{sHPmax}$ of zero in a box 39. This information is returned to step S2. If the result in step S5, however, is negative, it is gathered that the displacement ratio is greater than zero and smaller than 0.95, with the result that the speed of the internal combustion engine is to be reduced to the new, then current speed $n'_{diesel}=n_{diesel}-\Delta n_{diesel}$ of the internal combustion engine $-\Delta n_{diesel}$ of the internal combustion engine. The increment of the speed reduction $\Delta n_{diesel}$ can be determined in advance. This information is also returned to step S2. If the result of step S4 is negative, i.e. the displacement ratio $V_{sHP}/V_{sHPmax}$ is greater than 0.95, it is determined in a step S6 whether the displacement ratio $V_{sHP}/V_{sHPmax}$ is equal to 0.95 or not. With a positive result in step S6, the information in box 41 is returned to step S2 which says that the speed of the internal combustion engine must be kept constant, i.e. the current speed $n_{diesel}$ of the internal combustion engine is equal to the setpoint speed $n'_{diesel}$ of the internal combustion engine. If, however, the result in step S6 is negative, i.e. the displacement ratio $V_{sHP}/V_{sHPmax}$ is greater than 0.95, in a step S7 the information of box 42 is output which says that the speed of the internal combustion engine is to be increased to obtain a new setpoint speed $n'_{diesel}$ of the internal combustion engine which results from the current speed $n_{diesel}$ of the internal combustion engine+$\Delta n$ diesel of the internal combustion engine, where the increment $\Delta n_{diesel}$ of the internal combustion engine can be determined in advance. This information is also returned to step S2.

If the result of the determination in step S3 is negative, i.e. LZ is smaller than LZ set, it is examined in a step S8 whether LZ is equal to LZ' set or not. With a positive result in step S8, it is determined in a step S9 whether the displacement ratio $V_{sHP}/V_{sHPmax}$ is greater than 0.95 or not. With a negative result of step S9, according to box 43, the information is output saying that the speed of the internal combustion engine is to be kept constant because the current speed $n_{diesel}$ of the internal combustion engine corresponds to the setpoint speed $n'_{diesel}$. If this information of box 43 has occurred, it is transmitted to step S2. With a positive result of step S9, however, information is output according to box 44 which says to increase the speed of the internal combustion engine, where this new setpoint speed $n'_{diesel}$ of the internal combustion engine is the sum of the current speed $n_{diesel}+\Delta n_{diesel}$ of the diesel engine, where the increment $\Delta n_{diesel}$ can be determined in advance. This information is processed in step S2.

If the result of step S8 is negative, i.e. LZ does not correspond to LZ' set, it is determined in a step S10 whether LZ is greater than LZ' set. The positive result of step S10 leads to step S11 where it is determined whether the displacement ratio $V_{sHP}/V_{sHPmax}$ is greater than 0.95 or not. Independent of whether the result of this determination is positive or negative, the information in a box 45 is returned to step S2, whereby the speed of the internal combustion engine is to be increased, so that the new setpoint speed $n'_{diesel}$ of the internal combustion engine is equal to the sum of the current speed $n_{diesel}+\Delta n_{diesel}$ actual, where the increment of the change of speed $\Delta n_{diesel}$ can be determined in advance. In this manner, in the closed loop R, the information of the box 39 or 40 or 41 or 42 or 43 or 44 or 45 are each processed in step S2, which all relate to the dynamic adaptation of the speed of the internal combustion engine M. In step S2 it is evaluated whether the new setpoint speed $n'_{diesel}$ of the internal combustion engine is higher than the maximum speed $n_{max}$ in order to then decide with the determination of the new operating state whether the new setpoint speed $n'_{diesel}$ of the internal combustion engine must be equal to the maximum speed, or whether the new setpoint speed $n'_{diesel}$ is anyway already present.

As a summary, a dynamic adaptation of the speed of the internal combustion engine M is performed in response to the load condition or load factor (FIG. 4, FIG. 5), where the required volume flow rates are kept constant in the current operating point. This is done either by adjusting the variable displacement pump 4 or the several variable displacement pumps 4 with a characteristic curve stored in the control device 10, or by closed-loop control of the variable displacement pump or variable displacement pumps by compensating the current speed of the hydraulic motors with a predetermined setpoint. If the required volume flow rate is fallen below, the speed of the internal combustion engine is thus automatically increased.

The optimum operating point is determined by evaluating the load condition of the internal combustion engine. The utilization of the internal combustion engine M is ideally permanently approx. 95% (FIG. 4). The aim of the adaptation of the speed of the internal combustion engine M is to keep the load condition constant. All laying-relevant working components of the road finishing machine F or the feeder B (in the feeder, too, the function of the working components depends on laying parameters of the supplied road finishing machine) comprise hydraulic motors and variable displacement pumps for driving the hydraulic motors, where the variable displacement pumps permit a constant volume flow rate and thus a constant power take-off by the hydraulic motor by adjusting the displacement, independent of the initial speed of the variable displacement pump. Only if the maximum displacement of the variable displacement pump is reached, a further increase of the volume flow rate must be effected by increasing the speed of the internal combustion engine, if it is required to keep the power take-off constant. The displacement of the variable displacement pumps is constantly adapted to the current operating point of the internal combustion engine in operation. This can either be effected, without control, by previously calibrating the control currents of the variable displacement pumps which correspond to the respective displacement, so that a constant volume flow rate with a characteristic curve stored in the control device 10 can be adjusted. If the speed of the internal combustion engine is lowered, for example, to a low level, the displacement of the variable displacement pump can be correspondingly adapted in the control device 10 with reference to the stored characteristic curve to maintain the constant volume flow rate.

As an alternative, the displacement of the variable displacement pumps can be controlled in operation to the operating point of the internal combustion engine by using speed or velocity sensors which are anyway available or will be provided in the road finishing machine F or the feeder B at the laying-relevant working components or their hydraulic motors, and which sensors constantly supply speed or velocity information to the control device 10. Here, closed-loop control is performed with a setpoint/actual-value compensation to keep the volume flow rate constant, so that the speed levels of the driven hydraulic motors are kept constant.

If a generator, in most cases a three-phase alternator, is driven by the internal combustion engine, its taken-off load does not have any noteworthy influence on the dynamic speed adaptation as modern three-phase alternators can be very easily power-controlled via the exciting current.

Altogether, the internal combustion engine can be operated with an advantageous fuel consumption by the dynamic speed adaptation with automatic or characteristic-guided adaptation of the displacement or the displacements of the variable displacement pumps, so that environmental pollution is reduced altogether and several tons of fuel can be saved per year and at an average utilization of a road finishing machine F or a feeder B. The operator does not have to influence the required closed-loop control of the displacement or the displacements as it is done either automatically or guided by characteristics. The complexity as concerns optionally additionally provided velocity or speed sensors for the hydraulic motors or their working components is negligible.

| List of illustrated variables | Variable | Unit |
| --- | --- | --- |
| Load condition | LZ | % |
| Load condition setpoint | LZ' | % |
| Engine torque | $M_{diesel}$ | Nm |
| Hydraulic motor torque | $M_{hydro}$ | Nm |
| Engine speed | $n_{diesel}$ | 1/min |
| Engine speed, setpoint | $n'_{diesel}$ | 1/min |
| Hydraulic motor speed | $n_{hydro}$ | 1/min |
| Hydraulic motor speed, setpoint | $n_{hydro\ set}$ | 1/min |
| Maximum engine speed | $n_{max}$ | 1/min |
| Volume flow rate | V | l/min |
| Displacement of hydraulic motor (optionally variable displacement motor) | $V_{sHm}$ | cm³/U |
| Displacement of variable displacement pump | $V_{sHp}$ | cm³/U |
| Displacement ratio of variable displacement pump | $V_{sHp}/V_{sHPmax}$ | — |
| Maximally possible displacement of variable displacement pump | $V_{sHPmax}$ | l/min |
| Displacement of variable displacement pump, setpoint | $V_{sHP\ set}$ | cm³/U |
| Speed adjustment of internal combustion engine | $\Delta n_{diesel}$ | 1/min |

The invention claimed is:

1. Method for closed-loop power control in a hydrostatic system of a road finishing machine or feeder having working components, which comprises
employing a control device for operational control of a primary power plant of the road finishing machine driven by an internal combustion engine, the system having a plurality of hydraulic variable displacement pumps that are hydraulically connected with hydraulic motors of the working components,
operating the internal combustion engine under the control of a control device and within an engine-specific characteristic map, adjusting the operation of the internal combustion engine in response to the load condition of the engine using dynamic speed adaptation in a predetermined characteristic zone and
simultaneously adjusting the displacements ($V_{sHP}$) of the variable displacement pumps to maintain constant volume flow rates for the hydraulic motors.

2. Method according to claim 1, which comprises adapting the displacements ($V_{sHP}$) with reference to an engine speed/displacement characteristic curve deposited or stored in the control device and previously calibrated control current values for an electric displacement adjustment.

3. Method according to claim 1, which comprises adapting the displacements ($V_{sHP}$) by using a closed-loop control and setpoint/actual-value compensation of values generated and predetermined for the control device by speed or velocity sensors of the hydraulic motors or working components.

4. Method according to claim 1, which comprises adjusting a current operating point within the characteristic zone based on optimized fuel consumption, and for which the required volume flow rates for the hydraulic motors are kept constant by adapting the displacement ($V_{sHP}$).

5. Method according to claim 1, which comprises controlling the displacement adaptation range of the variable displacement pumps and the operating points of the internal combustion engine along an optimum engine output characteristic curve to be below a maximum power characteristic.

6. Method according to claim 1, which comprises adjusting a new current operating point with a higher speed of the internal combustion engine using the closed-loop control when the respective maximally possible displacement is reached and the volume flow rate falls below the required level, and adjusting a new current operating point with a low speed of the internal combustion engine when the minimal possible displacement is reached and the required volume flow rate is exceeded.

7. Method according to claim 1, which comprises evaluating a control loop defining the control response in the dynamic speed adaptation of the internal combustion engine, the respective current load condition of the internal combustion engine and the current adjusted displacement ($V_{sHP}$) of the variable displacement pump and considering the required volume flow rate ($V_{set}$).

8. Road finishing machine or feeder which comprises a primary power plant with an internal combustion engine, and a plurality of hydraulic variable displacement pumps the variable displacement pumps being hydraulically connected with hydraulic motors of the working components, and containing a computerized control device wherein a control loop arranged in the control device or connected therewith for evaluating the load condition of the internal combustion engine and the current displacement of the variable displacement pumps is provided, whereby the speed of the internal combustion engine can be dynamically adapted in response to the load condition of the engine to an operating point in a predetermined characteristic zone within an engine-specific characteristic map and simultaneously the displacements ($V_{sHP}$) of the variable displacement pumps can be changed to maintain constant volume flow rates for the hydraulic motors.

9. Road finishing machine or feeder according to claim 8, which comprises storing operating points in the form of a characteristic curve representing the dependence between the engine speed ($n_{diesel}$) and the displacement ($V_{sHP}$) for dynamic speed adaption of the internal combustion engine in response to the current engine load condition.

10. Road finishing machine or feeder according to claim 8, wherein the displacement ($V_{sHP}$) of each variable displacement pump is adjustable by at least one proportional solenoid valve by feeding current with a variable control current.

11. Road finishing machine or feeder according to claim 8, wherein the hydraulic motors or working components driven by the motors comprise speed or velocity sensors connected to the control device to transmit signals, and, a compensation section for compensation of speed or velocity values is contained in the closed-loop control for keeping the volume flow rates constant.

12. Road finishing machine or feeder according to claim 9, which comprises apparatus for calibrating the control currents of the proportional solenoid valves of the variable displacement pumps prior to preparing the stored or deposited operating point characteristic.

13. Road finishing machine or feeder according to claim 8, which comprises a pump transfer gear between the variable displacement pumps and the internal combustion engine, at least one further hydraulic pump is connected to the pump transfer gear, and at least one generator is connected to the internal combustion engine.

14. Road finishing machine or feeder according to claim 8, wherein the road finishing machine or the feeder comprises a group of hydraulic motors at least one of the group consisting of at least one travel drive for a travel gear, at least one longitudinal, transverse or ascending conveying device, and at least one screed compaction and/or adjustment means connected to variable displacement pumps.

* * * * *